(12) United States Patent
Wakabayashi et al.

(10) Patent No.: US 6,674,594 B1
(45) Date of Patent: Jan. 6, 2004

(54) READ/WRITE HEAD AND MAGNETIC RECORDING DEVICE

(75) Inventors: Kouichirou Wakabayashi, Toride (JP); Teruaki Takeuchi, Kitasouma-gun (JP); Nobuyuki Inaba, Hasuda (JP)

(73) Assignee: Hitachi Maxell, Ltd., Ibaraki (JP)

( * ) Notice: Subject to any disclaimer, the term of this patent is extended or adjusted under 35 U.S.C. 154(b) by 0 days.

(21) Appl. No.: 10/031,338

(22) PCT Filed: Jul. 19, 2000

(86) PCT No.: PCT/JP00/04842
§ 371 (c)(1),
(2), (4) Date: Jan. 25, 2002

(87) PCT Pub. No.: WO01/06498
PCT Pub. Date: Jan. 25, 2001

(30) Foreign Application Priority Data

Jul. 21, 1999 (JP) ............................. 11-206453

(51) Int. Cl.$^7$ ............................. G11B 5/02; G11B 5/596
(52) U.S. Cl. ....................................... 360/59; 360/77.03
(58) Field of Search ............................. 360/59, 77.03, 360/110, 313, 317, 318

(56) References Cited

U.S. PATENT DOCUMENTS

| | | | |
|---|---|---|---|
| 5,349,745 A | * 9/1994 | Kawabe et al. | ......... 29/603.18 |
| 5,523,898 A | 6/1996 | Jove et al. | ..................... 360/66 |
| 2001/0021076 A1 | * 9/2001 | Kojima et al. | ................. 360/59 |

FOREIGN PATENT DOCUMENTS

| | | |
|---|---|---|
| JP | 3-189905 A | 8/1991 |
| JP | 3-189915 A | 8/1991 |
| JP | 4-176034 A | 6/1992 |
| JP | 6-203303 | 7/1994 |
| JP | 6-243527 A | 9/1994 |
| JP | 7-110920 A | 4/1995 |
| JP | 8-221918 A | 8/1996 |
| JP | 8-339514 A | 12/1996 |

* cited by examiner

Primary Examiner—Regina N. Holder
(74) Attorney, Agent, or Firm—Oliff & Berridge, PLC

(57) ABSTRACT

A magnetic recording apparatus includes a laser light source (132), a recording magnetic head (131) and a magnetoresistive element. The recording magnetic head includes a pair of magnetic poles (100 and 101), between which the magnetoresistive element is interposed. A rotary actuator (Sa) positions the recording magnetic head at a desired track of a magnetic recording medium. A laser beam can be radiated onto the magnetic recording medium to raise the temperature of a region (302) of the medium. This region has a width of the order of the track width. The raised temperature lowers the coercive force of this region, where a recording magnetic field can be applied for high density recording. The rotary actuator may form a yaw angle (θ) with a track of the magnetic recording medium. Even in this case, the recording magnetic head (131) and the reproducing element have no tracking offset from the code track. In addition, if the size of the magnetic poles (100 and 101) of the recording magnetic head are set within a predetermined range, the region (302) heated by the laser beam does not deviate from a recording magnetic field application region (303).

16 Claims, 10 Drawing Sheets

(a)

(b)

(a)

(b)

(a)

DIRECTION OF RECORDING MEDIUM MOVEMENT (b)

DIRECTION OF RECORDING MEDIUM MOVEMENT

READ/WRITE HEAD AND MAGNETIC RECORDING DEVICE

TECHNICAL FIELD

The present invention relates to a recording/reproducing head for recording information on magnetic media and reproducing recorded information. The invention also relates to a magnetic recording apparatus using such a recording/reproducing head.

BACKGROUND ART

In a magnetic recording apparatus which records a magnetic information mark on a code track of a magnetic recording medium by scanning the medium with a recording/reproducing head, and reproduces information by detecting with this head the magnetic field leaking from the information mark, it is necessary for the head to accurately follow up the track. In order to solve this problem, a track servo method is used in general. The track servo method involves causing a recording/reproducing head to accurately follow up a code track of a magnetic recording medium on which servo burst patterns for track servo are recorded in advance. According to this method, the reproduction of the servo burst patterns with the recording/reproducing head makes it possible to detect the offset (deviation) of the head from the code track. On the basis of the detected offset, it is possible to correct the position of the recording/reproducing head. Such track servo needs an actuator for moving the recording/reproducing head to any track and causing the head to follow up the track. In general, a rotary actuator for turning a swing arm is used. A linear actuator may alternatively be used, but the rotary actuator is used more widely because it enables the configuration of the servo system to be simpler, enabling the magnetic recording apparatus to be smaller and the cost to be lower.

FIG. 6 schematically shows a magnetic recording medium 200 and a recording/reproducing head 204 for use with a rotary actuator. The recording/reproducing head 204 is mounted on a slider 110, which is fitted to the front end of a swing arm 133. During track servo, the swing arm 133 pivots on the axis of the rotary actuator 201 to position the recording/reproducing head 204 on any code track of the recording medium 200.

The prevailing recording/reproducing head is a combined recording/reproducing head, which consists of a recording magnetic head 203 for recording information and a reproducing magnetic head 202 for reproducing recorded information and management information such as addresses. FIG. 8 schematically shows a conventional combined recording/reproducing head. As shown in FIG. 8, the recording/reproducing head 204 is mounted on the rear of a slider 110, which is fitted to the front end of a swing arm 133. The movement (rotation) of a magnetic recording medium 200 in the direction indicated by an arrow shown in FIG. 8 forces air in under the slider 110. The air lifts the slider 110 from the recording medium 200. In the meantime, the swing arm 133 pushes the slider 110 toward the recording medium 200. The lifting and pushing forces counterbalance each other, causing the slider 110 and the recording/reproducing head 204 to float at a predetermined distance from the recording medium 200.

FIG. 9(a) is an enlarged section of the recording/reproducing head 204 shown in FIG. 8. The reproducing magnetic head 202 consists basically of magnetic shields 251 and 252 and a magnetoresistive element 253. The recording magnetic head 203 for recording information consists basically of the magnetic shield 252, a coil 254 and an upper magnetic pole 255. The magnetic shield 251 is formed adjacent to a substrate during the production process and referred to as a lower magnetic shield. The other magnetic shield 252 is formed over the magnetic shield 251 and referred to as an upper magnetic shield.

The lower and upper magnetic shields 251 and 252 of the reproducing magnetic head 202 function to improve spatial resolution by absorbing magnetic fields that leak from the peripheries of the shields and that are not necessary for reproduction. Some of the leaking magnetic fields may be magnetic fields (crosstalk) leaking from the information marks recorded on the code tracks adjacent to a code track from which information is being reproduced. Others of the magnetic fields leaking from the peripheries may be magnetic fields (interference between codes) leaking from the information marks preceding and succeeding a track from which information is being reproduced. For less crosstalk and/or for easier production of the recording/reproducing head 204, it is preferable that the shields 251 and 252 be wider than the spacing of the code tracks.

The electric resistance of the magnetoresistive element 253 of the reproducing magnetic head 202 is changed by the magnetic field leaking from a record mark recorded on the magnetic recording medium 200. By applying a suitable bias to the magnetoresistive element 253, it is possible to detect the existence or nonexistence of a record mark as the amplitude of an electric signal. The magnetoresistive element 253 is more sensitive than the conventional inductive heads and can detect the existence or nonexistence of an information mark. Therefore, the magnetoresistive element 253 is used widely in particular to reproduce information from magnetic recording media on which information is recorded densely. However, because the magnetoresistive element 253 can generate no magnetic field for recording, the separate recording magnetic head 203 is necessary which can generate recording magnetic fields.

The recording magnetic head 203 is basically identical in structure with the conventional inductive heads and needs a lower magnetic pole for pairing with the upper magnetic pole 255. If a lower magnetic pole were separately provided, however, the space between the recording and reproducing heads 203 and 202 would be too large. Therefore, in many common cases, the upper magnetic shield 252 of the reproducing magnetic head 202 is shared also as the lower magnetic pole of the recording magnetic head 203. In fact, the wider the space between the heads 203 and 202, the larger the offset between the tracks followed up by the heads 202 and 203. The offset is caused by the yaw angle made by the use of the rotary actuator. This problem will be explained below in detail.

With reference to FIG. 7, the conventional track servo method during information recording and reproduction will be described with the rotary actuator shown in FIG. 6, the recording/reproducing head 204 shown in FIG. 8, and the magnetic recording medium 200, on which servo burst patterns 220–223 for track servo are recorded in advance. During track servo, as shown in FIG. 7, the reproducing magnetic head 202 reproduces the patterns 220 and 221, and the position of this head 202 is controlled in such a manner that the reproduced patterns 220 and 221 are equal in amplitude. Specifically, the difference between the signals representing the reproduced patterns 220 and 221 is the basis for generating a tracking error signal 226, which represents the offset of the reproducing magnetic head 202 from a track. The position of this magnetic head 202 is controlled in such a manner that the level of the error signal 226 is 0. Hereinafter, the "0" level of the error signal 226 will be referred to as a reproducing servo target position 224.

The recording/reproducing head 204 is fitted to the front end of the swing arm 133, which, as shown in FIG. 6, pivots on the axis of the rotary actuator 201. Consequently, the axis of the recording/reproducing head 204 inclines at an angle of θ (yaw angle) with (the line direction of) the code tracks (FIG. 7). If this head 204 is a combined recording/ reproducing head as mentioned above, the yaw angle of θ causes the loci described by the reproducing and recording magnetic heads 202 and 203 to differ from each other. The yaw angle is a function of the radius of the magnetic recording medium and the space of D between the heads 202 and 203. The larger the yaw angle or the space of D, the larger the offset between the loci. During information reproduction, if the reproducing magnetic head 202 accurately follows up a code track, the recording magnetic head 203 may follow up any position. During information recording, however, the recording magnetic head 203 needs to accurately follow up a code track.

Japanese Patent Application Laid-Open No. 8-221918 discloses an electric head position correction method as a means for solving the foregoing problem. This method involves setting a recording servo target position 225 during recording, in addition to the reproducing servo target position 224. This is based on the following idea. As shown in FIG. 7, when the reproducing magnetic head 202 follows up a code track m, the recording magnetic head 203 follows up the position offset by ΔT from the track m. Accordingly, during recording, if the reproducing magnetic head 202 is caused to follow up the position (track m') offset by -ΔT from the track m, the recording magnetic head 203 follows up the track m. In order for the reproducing magnetic head 202 to follow up the offset position, it is necessary to carry out track servo in such a manner that, as shown in FIG. 7, the level of the tracking error signal 226 is "α". The practical track servo involves applying a DC offset of "-α" to the error signal 226, with the same results. Hereinafter, the level of "α" of the error signal 226 will be referred to as the recording servo target position 225. As stated already, the yaw angle is a function of:the radius of the magnetic recording medium. Accordingly, the offset ΔT between the loci of the reproducing and recording magnetic heads is another function of the radius. In other words, the recording servo target position 225 is still another function of the radius, and it is updated for each recording radius.

The foregoing means positions the recording magnetic head 203 so that this head can accurately follow up a code track during recording. Then the recording magnetic head 203 records information on the code track. The recorded user data is a digital time series signal of "1" or "0". Before the signal is recorded, it is modulated or otherwise preprocessed into a record signal. Similarly to the user data, the record signal is a digital time series signal of "1" or "0". In accordance with the record signal, a recording drive circuit (not shown) supplies a current to the coil 254, which is shown in FIG. 9(a). This current generates in the upper magnetic shield 252 and the upper magnetic pole 255 a time-changing magnetic field corresponding to the record signal. Specifically, "1" of a record signal row is recorded with a positive current supplied to the coil 254. The positive current generates a left-hand (counterclockwise) magnetic field in the loop formed by the upper magnetic shield 252 and the upper magnetic pole 255 shown in FIG. 9(a). "0" of the record signal row is recorded with a negative current supplied to the coil 254. The negative current generates a right-hand (clockwise) magnetic field in the loop formed by the upper magnetic shield 252 and the upper magnetic pole 255 shown in FIG. 9(a).

FIG. 9(b) shows the recording/reproducing head 204 as viewed through the magnetic recording medium 200. When the left-hand magnetic field is generated, a magnetic flux leaks from the upper magnetic shield 252 and is absorbed by the upper magnetic pole 255. The magnetic flux generates a magnetic field in the recording medium 200 in the same direction as the medium 200 moves. As a result, a record mark 152-2 magnetized in this direction is formed in the recording medium 200. When the right-hand magnetic field is generated, a magnetic flux leaks from the magnetic pole 255 and is absorbed by the magnetic shield 252. This magnetic flux generates a magnetic field in the recording medium 200 in the direction opposite to the direction in which the medium 200 moves. As a result, a record mark 152-1 magnetized in the opposite direction is formed in the recording medium 200. Thus, the information recorded on the recording medium 200 is recorded as the directions of magnetization of the information marks 152-1, 152-2, etc.

The width (track width) of the information marks 152-1, 152-2, etc. recorded by the conventional recording magnetic head 203 shown in FIGS. 9(a) and 9(b) is determined by the width of the magnetic fields applied from this head 203 to the magnetic recording medium 200. The width of the applied magnetic fields is determined primarily by the width of the upper magnetic pole 255. In order to narrow the tracks by narrowing the information marks 152-1, 152-2, etc., it is necessary to narrow the magnetic pole 255 as well. However, the production of narrow magnetic poles needs expensive processing equipment such as an FIB. In addition, if the magnetic pole 255 is narrow, the magnetic fields that can be output from it may be too low in strength for recording.

Japanese Patent Application Laid-Open No. 3-189905 discloses a magnetic recording method (so-called light-assisted magnetic recording) for recording information on a magnetic recording medium while irradiating the medium with a laser beam emitted from a semiconductor laser, which is mounted on a magnetic head. The irradiation locally heats the recording medium to temporarily lower the coercive force of the heated region of the medium. This is advantageous because (the strength of) the recording magnetic field applied from the magnetic head can be lower than the coercive force of the recording medium.

Japanese Patent Application Laid-Open No. 4-176034 discloses another light-assisted magnetic recording method. In particular, this document discloses a method for reproducing information, which uses a magnetic recording medium including a recording layer made of a ferrimagnetic material having a compensation temperature about room temperature. During reproduction, a reproducing region of the recording layer is irradiated with a light beam to be heated. The heated region is magnified in magnetization. By detecting the magnetic flux leaking from the region magnified in magnetization, it is possible to reproduce information.

Japanese Patent Application Laid-Open No. 6-243527 discloses another light-assisted recording method. In particular, this document discloses a magnetic recording apparatus including a slider on which a magnetic head and a semiconductor laser are fixed. FIG. 2 of the document shows the relationship between a hot write part heated by the radiation of a laser beam and the facing position of the magnetic head. The facing position of the magnetic head is shown inside a high-temperature region.

However, if such a light-assisted recording method is used with a recording magnetic head driven by a rotary actuator, it is conceivable that a yaw angle problem, which will be stated later on, will arise between the semiconductor laser and the recording head.

The present invention has been completed to solve the foregoing various problems with a magnetic recording apparatus including a recording/reproducing head that can be positioned by a rotary actuator. The problems arise if the track spacing is narrowed for higher density.

A first object of the present invention is to provide a recording/reproducing head and a magnetic recording apparatus that can carry out reliable tracking servo in recording information with a magnetic head driven by a rotary actuator.

A second object of the present invention is to provide a recording/reproducing head and a magnetic recording apparatus that can generate a magnetic field having a necessary strength even for densely recording information on a narrow-track magnetic recording medium.

A third object of the present invention is to provide a recording/reproducing head and a magnetic recording apparatus that can record information reliably on a desired track by a light-assisted magnetic recording method with a magnetic head driven by a rotary actuator.

A fourth object of the present invention is to provide a recording/reproducing head and a magnetic recording apparatus that can be driven by a rotary actuator and produced at low cost, and that are suitable for a light-assisted magnetic recording method.

DISCLOSURE OF THE INVENTION

According to a first aspect of the present invention, there is provided a recording/reproducing head for recording information on a magnetic recording medium and reproducing information from the medium. The recording/reproducing head comprises:

a recording magnetic head for applying a magnetic field to a predetermined part of the recording medium, the magnetic head having a pair of magnetic poles;

a laser light source for irradiating at least part of the predetermined part with a laser beam; and a magnetoresistive element for detecting a magnetic field leaking from a record mark formed by the recording magnetic head, the magnetoresistive element being interposed between the pair of the magnetic poles of the magnetic head.

According to a second aspect of the present invention, there is provided a magnetic recording apparatus comprising:

a magnetic recording medium on which information can be recorded;

a recording/reproducing head for recording information on the recording medium and reproducing the recorded information; and a rotary actuator for moving the recording/reproducing head relative to the recording medium.

This recording/reproducing head includes:

a recording magnetic head for applying a magnetic field to a predetermined part of the recording medium, the magnetic head having a pair of magnetic poles;

a laser light source for irradiating at least part of the predetermined part with a laser beam; and a magnetoresistive element for detecting a magnetic field leaking from a record mark formed by the recording magnetic head, the magnetoresistive element being interposed between the pair of the magnetic poles of the magnetic head.

With reference to FIG. 10, the recording principle of the recording/reproducing head according to the present invention and the magnetic recording apparatus including this head will be explained. The pair of magnetic poles of the recording magnetic head of the recording/reproducing head are an upper magnetic shield 101 and a lower magnetic shield 100, which generate a recording magnetic field. The laser light source of the recording/reproducing head radiates a light spot 150 on a magnetic recording medium 140. FIG. 10 conceptually shows the positional relationship between the recording magnetic field and the light spot 150. FIG. 10 also conceptually shows the variation of the coercive force Hc of the recording film of the recording medium with respect to the positions of the recording magnetic field and the light spot. During information recording, the magnetic recording medium is moved in the direction of recording medium movement indicated by an arrow in FIG. 10. If a region where information is to be recorded is irradiated with the light spot 150, the region is heated to form a high-temperature region indicated by reference numeral 151.

It is known that the coercive force Hc of a magnetic recording medium is a function of the temperature T of the medium and expressed by the following expression (1).

$$Hc = H0(1 - \sqrt{\alpha T}) \tag{1}$$

where H0 is the coercive force in case of inversion only with a magnetic field without heat fluctuation influence (the coercive force at a temperature of 0 K (Kelvin)), and where α is the characteristic value determined by the recording medium. As apparent from the expression (1), the higher the temperature of the recording medium, the smaller the coercive force Hc. Accordingly, if a temperature distribution exists in the recording medium, the coercive force is smaller in a high-temperature region, as apparent from the expression (1), and the distribution of the coercive force is as shown by the upper and right graphs of FIG. 10. The coercive force changes reversibly. If the temperature of the recording medium returns to normal, the coercive force is restored to its original value.

The recording-limit coercive force of a magnetic recording medium is defined as the maximum coercive force of this medium at which information can be recorded stably with a recording magnetic field generated from a recording/reproducing head. The present invention uses a magnetic recording medium having a variable coercive force that is higher at normal temperature than the recording-limit coercive force of the medium. The invention also uses a laser light source. The intensity of the laser beam emitted from the light source is adjusted in such a manner that the variable coercive force lowered by a temperature rise is lower than the recording-limit coercive force. As shown by the upper graph of FIG. 10, the high-temperature region 151 represents the range where the variable coercive force is lower than the recording-limit coercive force HCL. Accordingly, information can be recorded in the high-temperature region 151. The intensity of the laser beam can be adjusted in such a manner that the width of the high-temperature region 151 in the track direction is narrower than the widths of the upper and lower magnetic shields 101 and 100. In order for the recording magnetic field to have a magnitude necessary for recording, the widths of the upper and lower magnetic shields 101 and 100 in the track direction may be greater than the width (track pitch) of the code tracks. Thus, by using a magnetic recording medium having a high coercive force at normal temperature, and by recording information in a region of the medium with a laser beam radiated onto this region to lower the coercive force of the region locally and temporarily, it is possible to record information on each code track even if the width of the upper and lower magnetic shields 101 and 100 are greater than the width of the code tracks. The right side of FIG. 10 shows marks (magnetic domains) 152-1 and 152-2 recorded on the recording medium according to this principle. It should be noted that, herein, the track direction means the direction perpendicular to the direction along the tracks, while the line direction means the direction along them.

The width of the upper magnetic pole of the conventional recording magnetic head defines track width. Therefore, for smaller track spacing for denser recording with the conventional recording magnetic head, it was necessary to narrow the upper magnetic pole 255 as shown in FIG. 9(*b*). This lowered the magnetic field strength that could be output from the recording magnetic head. The lowered field strength was not sufficient for recording. The recording/reproducing head according to the present invention records information in a region of a magnetic recording medium with a laser beam radiated onto the medium to locally lower the coercive force only of this region of the medium on which information is to be recorded. Accordingly, by suitably controlling the intensity of the laser beam or the spot diameter, it is possible to determine the track width independently of the widths of the magnetic poles which generate a magnetic field. This makes it possible to use a recording magnetic head with magnetic poles wider than the track width, making it possible to acquire a sufficient magnetic field strength even if the track spacing is small. In addition, this makes the magnetic head easy to produce. In order to provide a sufficient magnetic field strength to the recording film of a magnetic recording medium during information recording, it is preferable that the width W of the magnetic poles of the recording magnetic head of the recording/reproducing head according to the invention and the width Tw of the record marks recorded on the medium satisfy 2×Tw<W.

During information reproduction, a magnetoresistive element detects the magnetic fields leaking from the record marks recorded on a magnetic recording medium. As shown in FIG. 2(*b*), for example, the magnetoresistive element 111 of the recording/reproducing head according to the present invention is interposed between the upper and lower magnetic shields 101 and 100 of the recording head. Therefore, the upper and lower magnetic shields 101 and 100 improve the spatial reproducing resolution due to the magnetoresistive element 111 by absorbing magnetic fields that leak from the peripheries of the shields and that are not necessary for reproduction. The leaking magnetic fields may be magnetic fields leaking from record marks recorded on the tracks adjacent to a track from which the recording/reproducing head is reproducing information.

The magnetoresistive element 111 is interposed between the upper and lower magnetic shields 101 and 100 of the recording head. Accordingly, the recording magnetic head and the reproducing element are positioned at the same location, particularly in the direction along the swing arm that pivots by means of the rotary actuator. Even if the use of the rotary actuator causes a yaw angle to be formed, the recording magnetic head and the reproducing element have no tracking offset from the code tracks. Therefore, if the recording/reproducing head according to the present invention is mounted on the rotary actuator, it is not necessary to apply an electric offset to a tracking error signal, as was the case with the foregoing prior art. As a result, stable track servo can be realized even if the track spacing is small.

The magnetic recording apparatus according to the present invention includes a recording/reproducing head fitted with a laser light source. The magnetic recording apparatus also includes a rotary actuator and a swing arm, which position the recording/reproducing head at a desired track. The recording/reproducing head includes a recording head and a magnetoresistive element. The recording head, the laser light source and the magnetoresistive element may be mounted coaxially on a slider. In this case, as shown in FIG. 11, the axis Sa of the swing arm forms a yaw angle $\theta$ with the center Tc of the track. The laser light source 132 heats a heating-up region 302 of a magnetic recording medium. The upper and lower magnetic shields 101 and 100 apply a recording magnetic field to a region 303 of the recording medium. It is necessary to keep the heating-up region 302 from deviating in the track direction from the region 303. This requirement is met by a relational expression as explained below with reference to FIG. 12. As shown in FIG. 12, the axis Sa of the swing arm of the rotary actuator inclines at the yaw angle $\theta$ with the track center Tc of the magnetic recording medium. The emission port 300 of the semiconductor laser 132 has a width Wa. The heating-up region 302 heated by the semiconductor laser 132 has a width Tww in the track direction. The upper magnetic shield 101 of the recording head has a width Ww (=Wwp+Wwm). The distance between the semiconductor laser and the recording head is d. The foregoing requirement is expressed by the following expression (2).

$$Tww/2+d\times|\sin\theta|<Wwp\times|\cos\theta| \qquad (2)$$

The expression (2) expresses the following condition. A longitudinal half 101a (lower in FIG. 12) of the upper magnetic shield 101 has a vertical length component expressed as Wwp×cos $\theta$. The portion of the shield half 101a that is positioned above the track center Tc in FIG. 12 has a vertical length component expressed as d×sin $\theta$. In order for the half 101a of the recording head to completely cover the heating-up region 302, it is necessary to meet Tww/2+d×sin $\theta$<Wwp×cos $\theta$. This leads to the expression (2). A similar conception applies even to a case where the swing arm axis Sa inclines relative to the track center Tc to the side opposite the side to which it inclines in FIG. 11, that is to say, a case where $\theta$ is negative. If the lengths of Wwm and Wwp of the shield halves 101a and 101b, respectively, are equal (Wwm=Wwp), the relationship between the other half 100b of the upper magnetic shield 101 and the heating-up region 302 is defined with the expression (2). For Wwm=Wwp, wwp in the expression (2) can be replaced by Ww/2 (Wwp=Ww/2). Because $\theta$ in the expression (2) may be negative, the terms sin $\theta$ and cos $\theta$ in this expression are treated as absolute values. For $\theta$<0, if the halves 100 and 101 differ in length from each other (Wwm≠Wwp), Wwp in the expression (2) should be replaced by Wwm. As stated already, the emission port 300 of the semiconductor laser has a width of Wa. The correction coefficient (factor) based on the intensity distribution of radiated light is $\alpha$. The width of Tww of the heating-up region 302 may be expressed as Tww=$\alpha$×Wa×cos $\theta$. If the intensity distribution of light accords with Gaussian distribution, $\alpha$ is about 0.4.

Therefore, by selecting the upper magnetic shield 101, in particular its width Ww, for the yaw angle of $\theta$ of the rotary actuator and the width Wa of the emission port 300 of the semiconductor laser in such a manner that the expression (2) may be met, the heating-up region 302, which can be irradiated with a laser beam, can be positioned always within the magnetic field application region 303. This makes it possible to record information reliably on a desired track of the magnetic recording medium even when the rotary actuator and the swing arm move the laser light source and the recording/reproducing head.

In the present invention, in order to easily position the heating-up region 302 within the magnetic field application region 303, it is preferable that the distanced between the light emitting section of the laser light source and the magnetoresistive element be even shorter. The distance of d may be 5 µm or less.

BEST MODE OF THE INVENTION

Embodiments of the recording/reproducing head and the magnetic recording apparatus according to the present invention are described below in detail with reference to the drawings.

Recording/Reproducing Head

Figure 1:
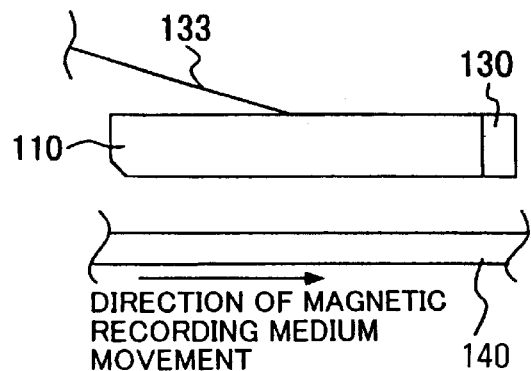
FIGS. 1(a) and 1(b) show an embodiment of the information recording/reproducing head of the present invention.
Figure 1:
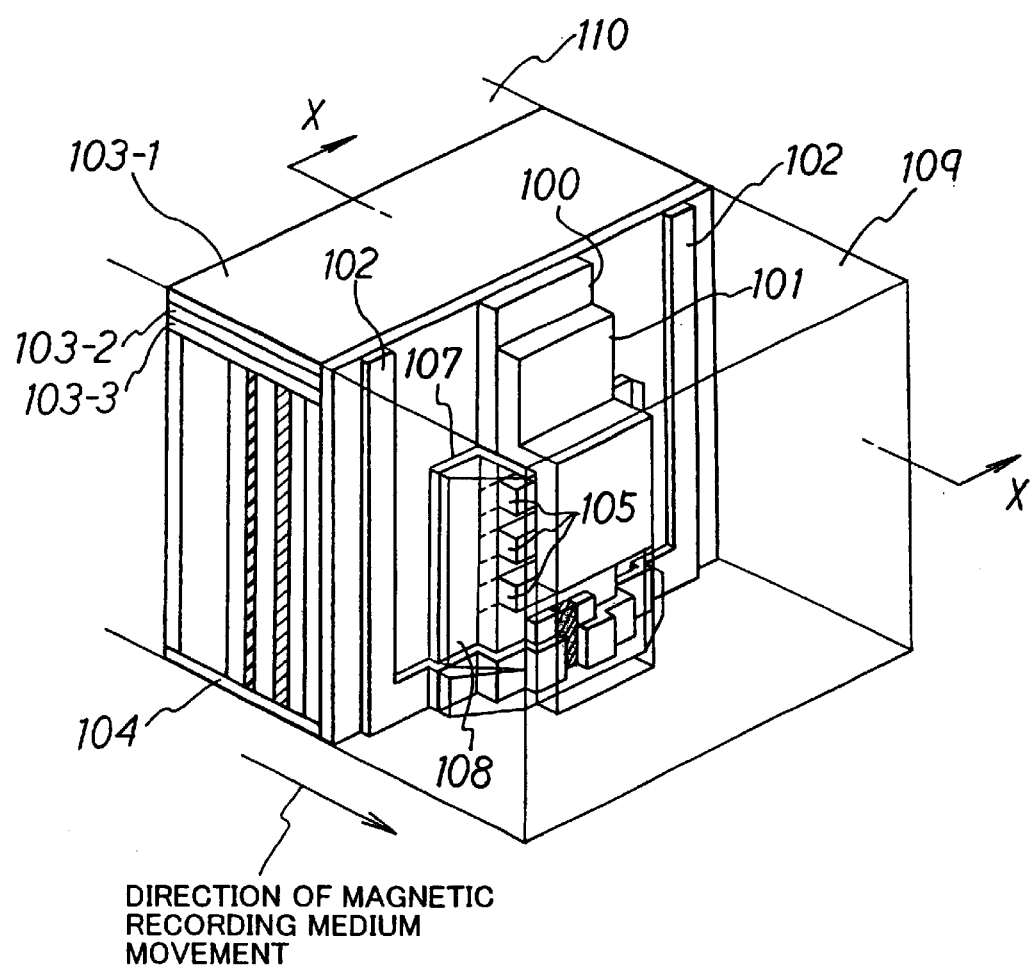

As shown in FIG. 1(a), a recording/reproducing head 130 is mounted on a slider 110, which is fitted to the front end of a swing arm 133. The rotation of a magnetic recording medium 140 forces air in under the slider 110. The air lifts the slider 110 from the recording medium 140. In the meantime, the swing arm 133 pushes the slider 110 toward the recording medium 140. The lifting and pushing forces counterbalance each other, causing the slider 110 and the recording/reproducing head 130 to float at a constant distance from the recording medium 140. In this embodiment, the floating distance was set at about 30 nm.

Figure 2:
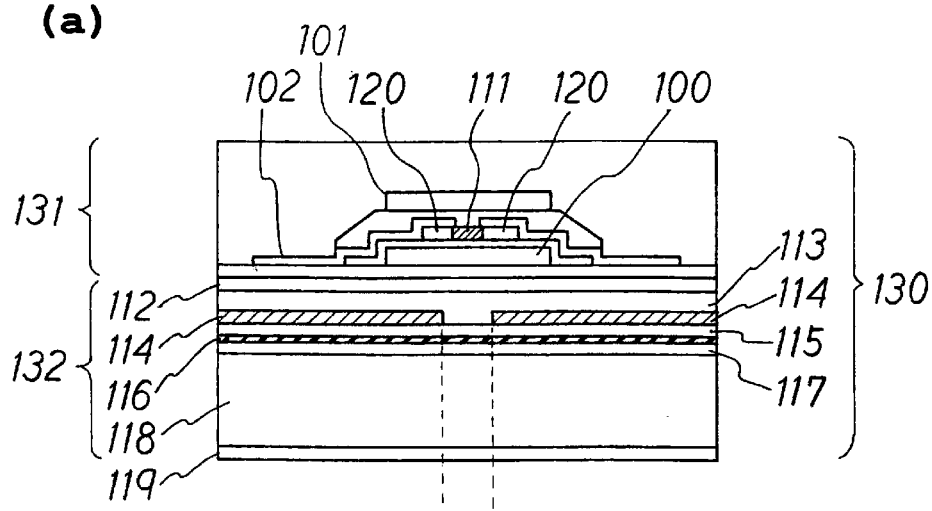
FIGS. 2(a) and 2(b) are sectional views of the information recording/reproducing head shown in FIG. 1.
Figure 2:
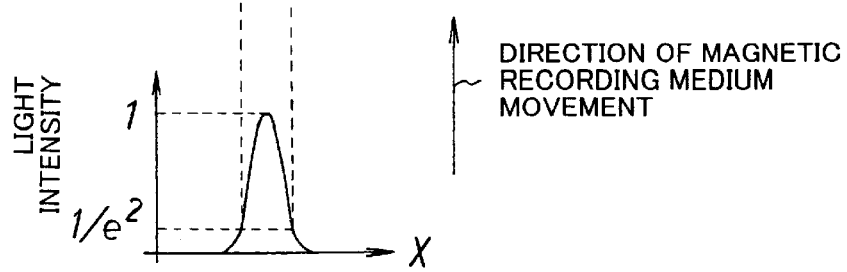
Figure 2:
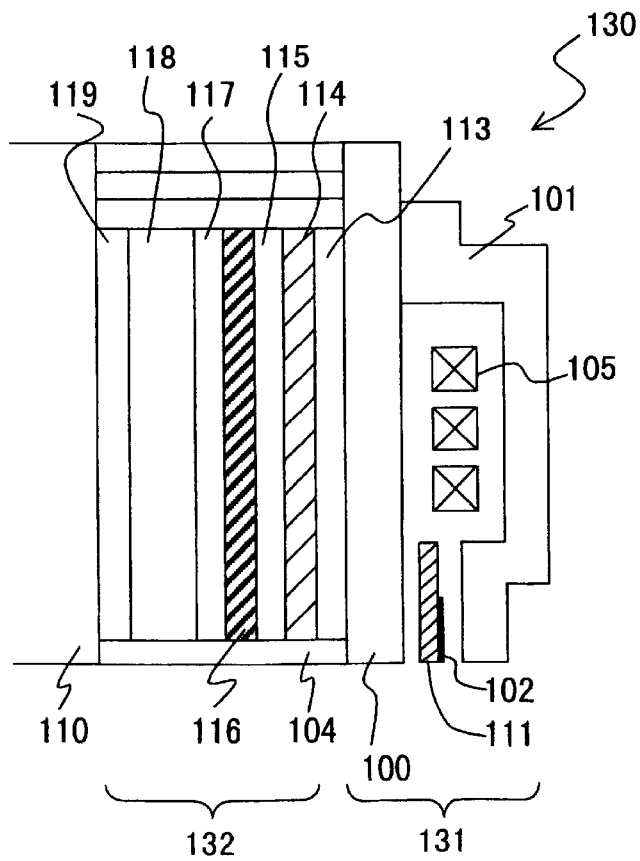

FIG. 1(b) is a perspective view of the recording/reproducing head 130. FIG. 2(a) is a plan view of the recording/reproducing head 130 as viewed from the magnetic recording medium 140. FIG. 2(b) is a schematic section of the recording/reproducing head 130 as taken along line X—X of FIG. 1(b). As shown in FIG. 2(a), the recording/reproducing head 130 consists of a magnetic head 131 and a laser semiconductor 132.

The semiconductor laser 132 is formed by the following process. First, a clad layer 117 of n-GaAlAs, an active layer 116 of GaAlAs, a clad layer 115 of p-GaAlAs, a pair of current blocking layers 114 of n-GaAs and a cap layer 113 of p-GaAs are formed in order on the (100) plane of a single-crystal n-GaAs substrate 118. Then, a p-electrode 112 and an n-electrode 119 are formed in such a manner that the layers 113–117 and the substrate 118 are sandwiched between the electrodes 112 and 119. Next, the n-GaAs substrate 118 is cleft at its (110) planes. Then, a $SiO_2$ film 104 is formed on one of the cleavage planes. The thickness of the $SiO_2$ film 104 is ¼ of the oscillation wavelength of λ. In the meantime, a $SiO_2$ film 103-3, an amorphous Si film 103-2 and a $SiO_2$ film 103-1 are formed in order on the other cleavage plane. The thickness of each film was adjusted to λ/4 so that high-output light might be acquired.

The active layer 116 has a p–n junction formed in it, which includes a positive p-electrode and a negative n-electrode. Application of voltage between the electrodes causes electrons and holes to be injected into the active layer. A current exceeding the threshold current generates laser oscillation, which causes a high-output laser beam to be output from the side of the $SiO_2$ film 104. The intensity of the laser beam on the $SiO_2$ film 104 shows itself in the form of the Gaussian distribution. If a spot width is defined as a width at which a strength standardized at the maximum strength is $1/e^2$, the spot width in the direction in which the magnetic recording medium moves is approximately equal to the width of the active layer 116, while the spot width in the track direction, which is perpendicular to that direction, is approximately equal to the space between the current blocking layers 114. In this embodiment, the thickness of the active layer 116 was 0.2 µm, and the space between the blocking layers 114 was 1 µm, the wavelength of λ being 650 nm. These values are examples used in the embodiment, and the present invention is not limited to them.

The laser beam emitted from the $SiO_2$ film 104 is divergent light. As stated already, the floating distance of the recording/reproducing head 130 relative to the magnetic recording medium 140 is about 30 nm, which is sufficiently smaller than the wavelength of 650 nm. In such a near-field condition, the size of the spots formed on the recording medium 140 is determined by the thickness (0.2 µm) of the active layer 116 and the space (1 µm) between the current blocking layers 114 independently of the wavelength of λ. In other words, the laser emission port (emission end) of the semiconductor laser 132 of this embodiment has a width of 1 µm.

The magnetic head 131 includes a lower magnetic shield 100, an upper magnetic shield 101, a pair of electrodes 102, a coil (coils) 105, a magnetoresistive element 111 and a pair of permanent magnets 120. The parts 100, 101, 102, 105, 111 and 120 form a layer structure. Some of these parts are insulated by insulating layers 106–108 so as not to be short-circuited. The elements forming the magnetic head 131 are protected by a protective layer 109 covering them (FIG. 1(b)).

Figure 9:
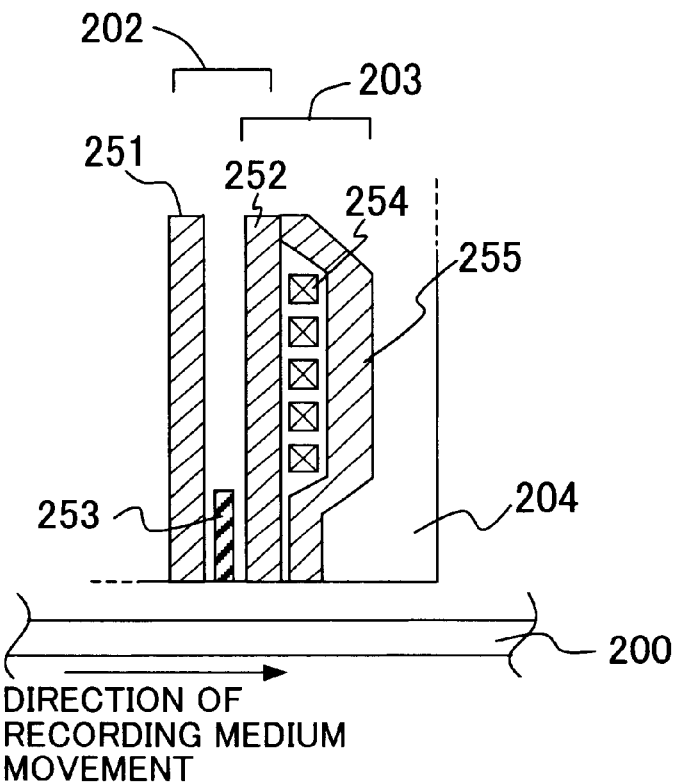
FIG. 9(a) is a longitudinal section of the recording/reproducing head of the magnetic head shown in FIG. 8.
FIG. 9(b) is a plan view of this recording/reproducing head as viewed through a magnetic recording medium.
Figure 9:
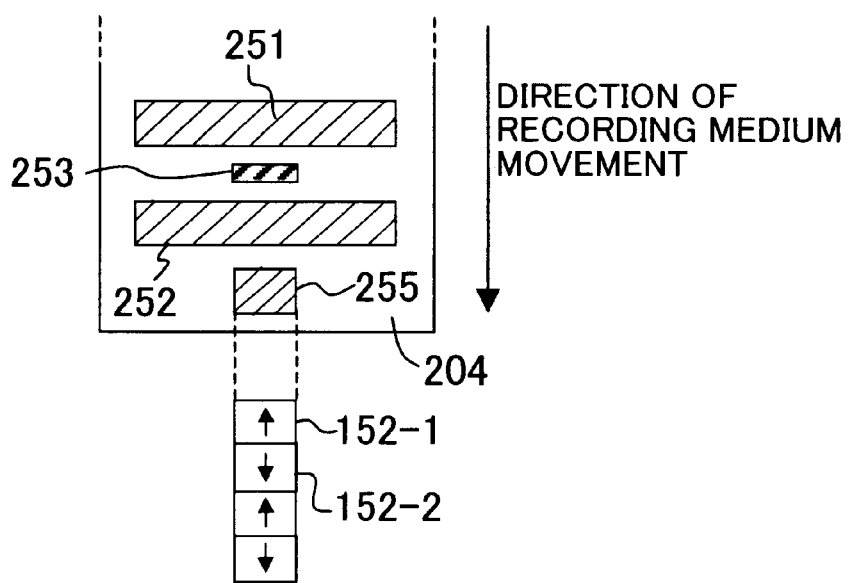

The magnetic head 131 of the present invention does not include an upper magnetic pole 255 as mounted on the conventional recording/reproducing head 204 (FIG. 9(a)). As shown in FIG. 2(b), the coil 105 for use during recording is interposed between the upper and lower magnetic shields 100 and 101. It is possible to record information by supplying the coil 105 with a current corresponding to a record signal row. The current generates in the upper and lower magnetic shields 100 and 101 a magnetic field corresponding to the record signal row. The magnetic field generated in the loop of the upper and lower magnetic shields 100 and 101 leaks from their lower ends toward the magnetic recording medium 140 and generates a magnetic field in the medium 140. In this embodiment, each of the upper and lower magnetic shields 100 and 101 had a width of about 3.3 µm in the track direction.

In this embodiment, the track width for recording is 0.5 µm, which is narrower than the upper and lower magnetic shields 100 and 101. In the present invention, the semiconductor laser 132 radiates a laser beam onto a track of the magnetic recording medium 140 on which information is to be recorded. The radiation lowers the coercive force of the recording medium 140 within a range narrower than the width of the uppe and lower shields 100 and 101. The relationship between the coercive force and the temperature of the recording medium 140 is explained below in detail.

Magnetic Recording Medium

Figure 4:
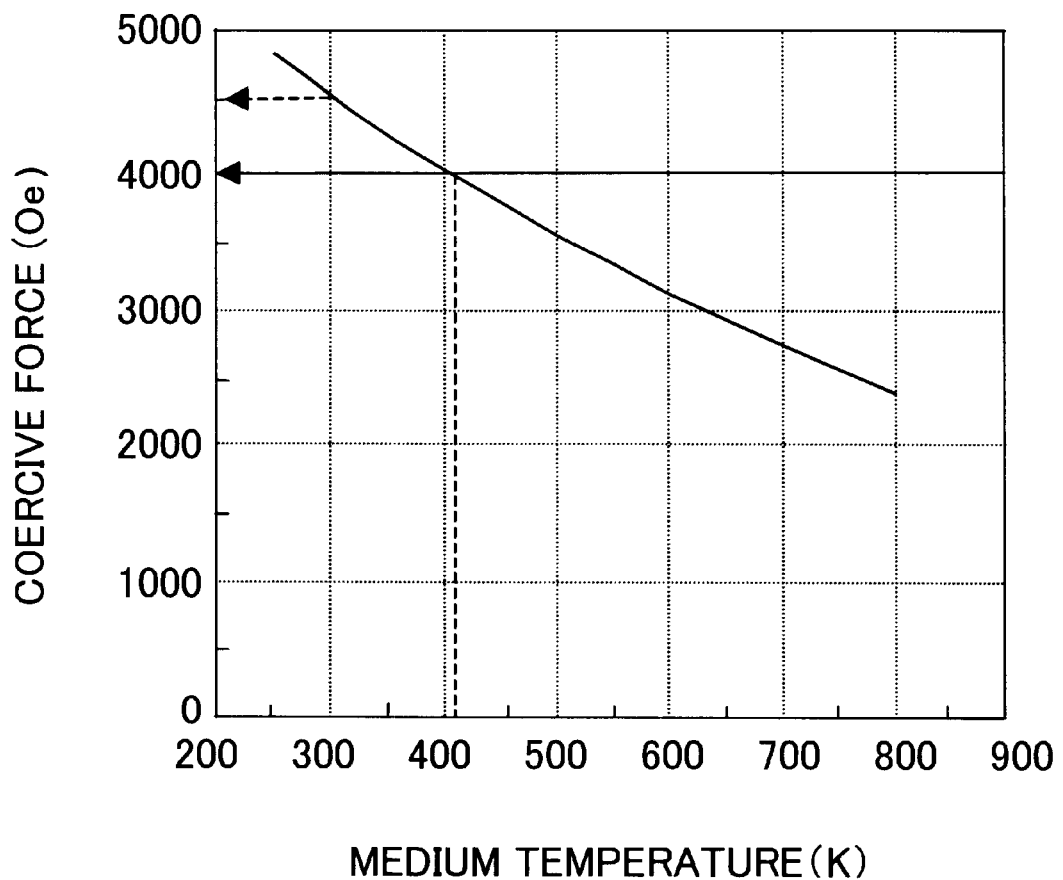
FIG. 4 shows the relationship between the coercive force of the magnetic recording medium of the present invention and the medium temperature.

FIG. 4 shows the medium temperature dependency of the coercive force of the magnetic recording medium 140 used in this embodiment. The coercive force of the recording medium 140 at normal temperature (300 K) is 4,500 (Oe). Because information can be stably recorded with the recording/reproducing head 130 on a medium having a coercive force of only 4,000 (Oe) or less, it is difficult to record information on the recording medium 140 at normal temperature. If the medium temperature is raised to 400 K or more, however, the coercive force of the medium lowers to 4,000 (Oe) or less, and it is therefore possible to record information sufficiently stably with the recording/reproducing head 130. The recording medium may be any available magnetic recording medium, such as a structure including a glass substrate in the form of a disk on which a magnetic recording layer and a protective layer lie. The recording layer may be made of Co—Cr—Pt.

Figure 10:
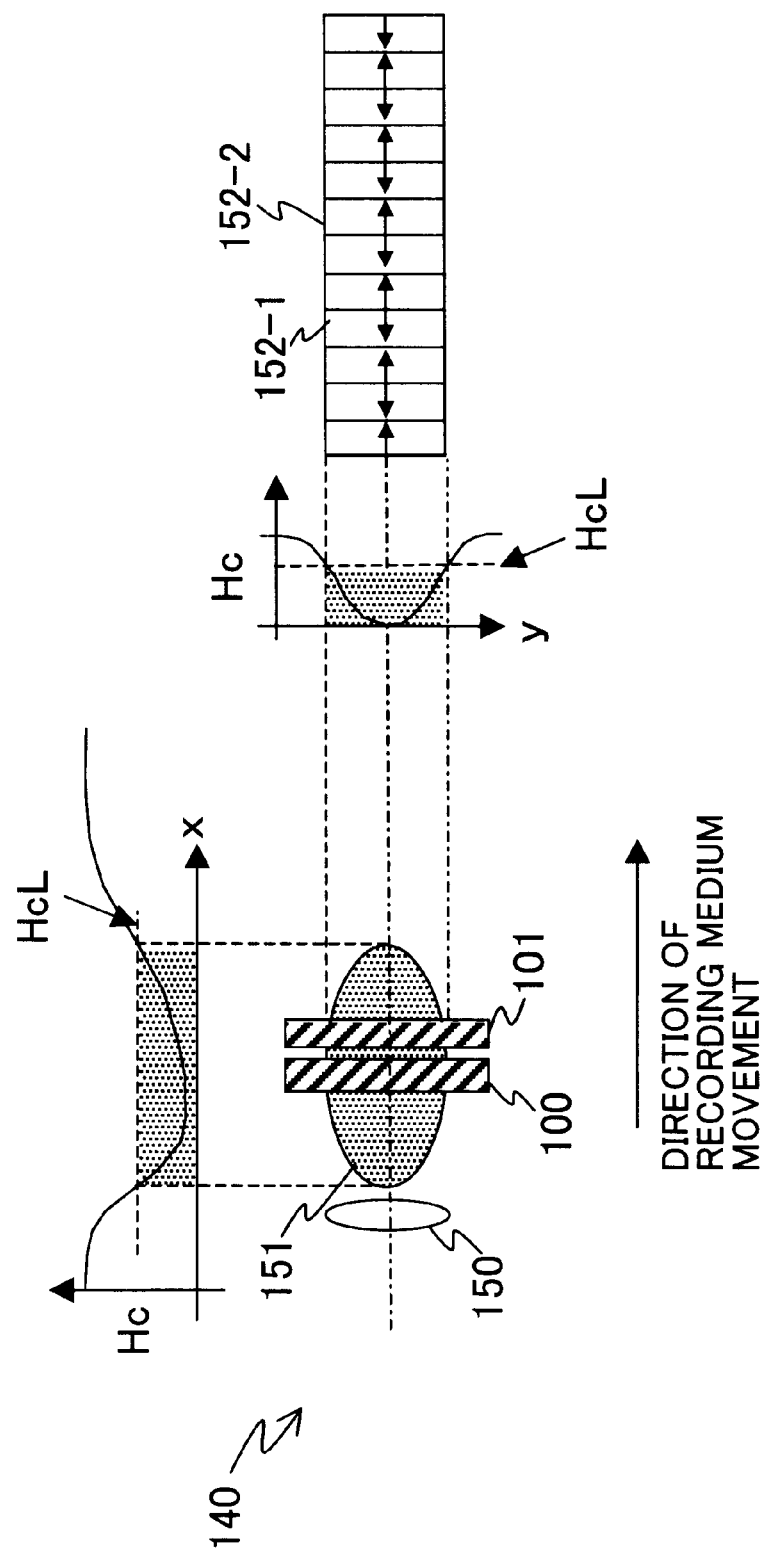
FIG. 10 shows a recording principle using the recording head of the present invention.

FIG. 10 describes track width control by means of a laser beam. The magnetic recording medium 140 forward of the upper and lower magnetic shields 101 and 100 is irradiated with a laser beam emitted from the laser semiconductor 132. The irradiation forms a light spot 150 on the recording medium 140. The light spot 150 raises the temperature of the recording medium 140 and forms a high-temperature region 151, where information can be recorded, in the medium 140. The temperature distribution of the recording medium 140 heated by the laser beam takes the form of an ellipse longer in the direction in which the medium 140 moves. A central portion along the major axis of the ellipse is higher in temperature. The region where such a temperature distribution exists forms a coercive force distribution where a hotter portion has a smaller coercive force as evident from the foregoing expression (1). The coercive force distribution is as shown by the upper and right graphs in FIG. 10. For the recording/reproducing head 130 used in this embodiment, the high-temperature region 151, where information can be recorded, is a region where the coercive force is 4,000 (Oe) or less. In this case, as evident from the graph of FIG. 4, the high-temperature region 151 corresponds to that region of the recording medium 140 used in this embodiment where the medium temperature is 400 K or more. The present invention involves setting the width along the y-axis of the high-temperature region 151, where information can be recorded, at a value smaller than the widths of the upper and lower magnetic shields 101 and 100 by controlling the intensity of the laser beam radiated onto the recording medium 140. Specifically, the laser beam intensity was adjusted in such a manner that the width along the y-axis of the high-temperature region 151 was about 0.4 µm. In this case, in connection with the expression (2), Wa, α and θ were Wa=1 µm, α=0.4 and θ=6 deg.

Figure 5:
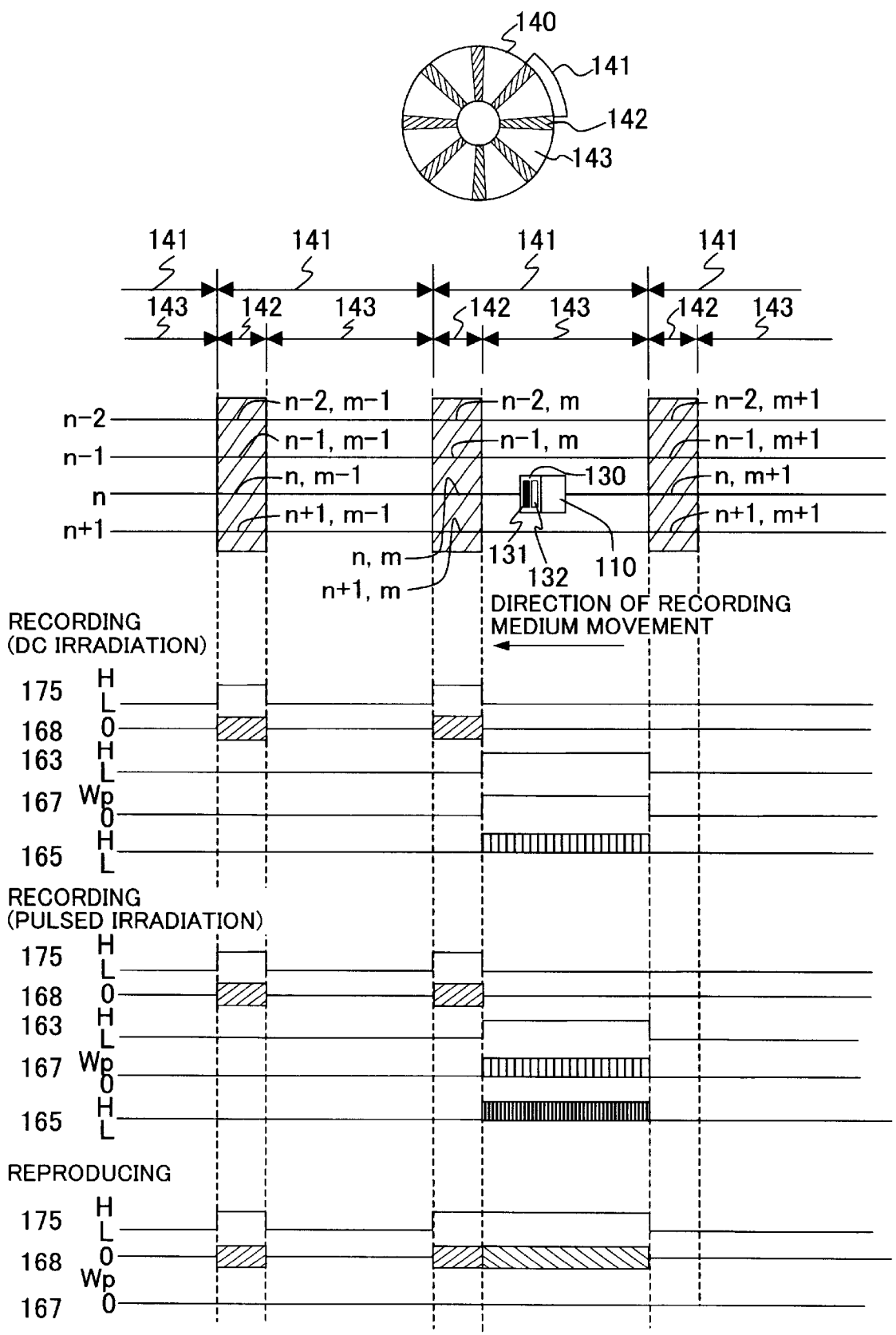
FIG. 5 shows the timing relationship between the magnetic recording medium of the present invention and each signal.

As shown at the top of FIG. 5, the magnetic recording medium 140 used in this embodiment takes the form of a disk and includes an information storage region, which is divided into a plurality of recording regions. Each of the recording regions is a sector 141, which consists of a management region 142 and a data storage region 143. Recorded in advance in the management region 142 are the address representing the physical position of the sector, servo burst patterns 220–223 (FIG. 7), etc. The servo burst patterns 220–223 are target signals with which the recording/reproducing head 130 can be positioned at the code tracks. User data are recorded in the storage region 143.

Magnetic Recording Apparatus

Figure 3:
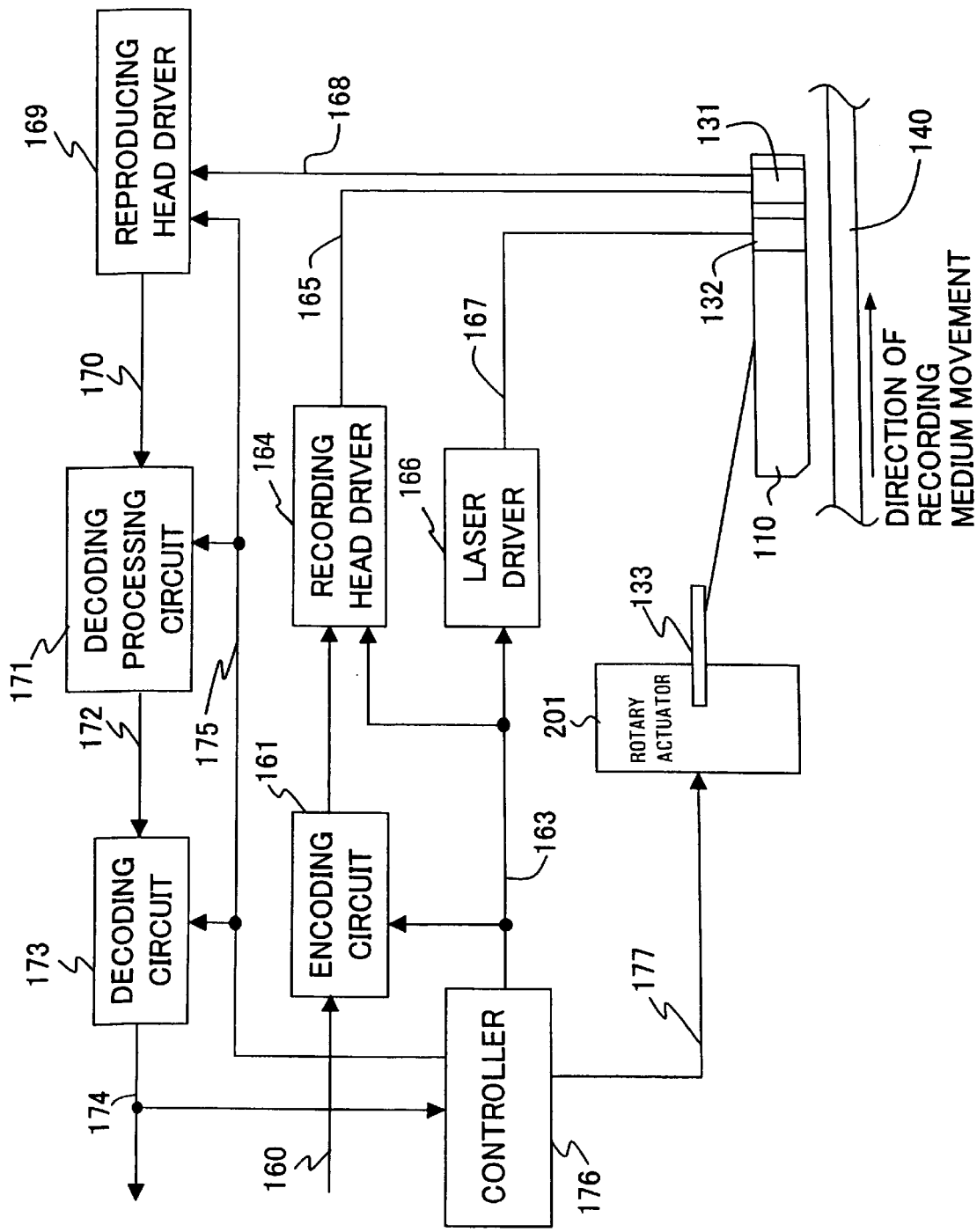
FIG. 3 shows an embodiment of the magnetic recording apparatus of the present invention.
Figure 6:
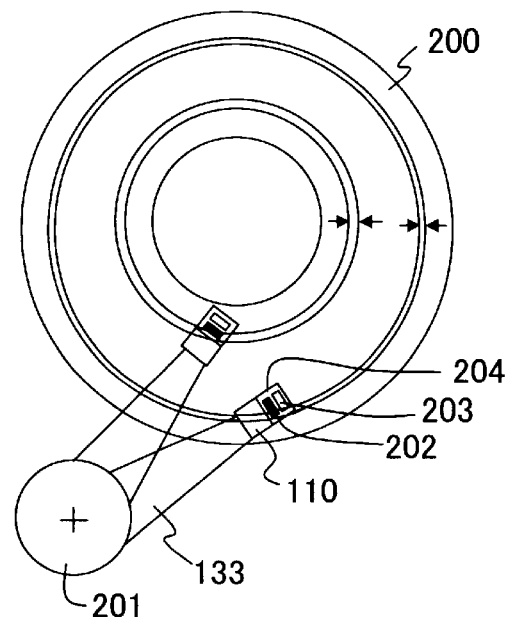
FIG. 6 shows how a rotary actuator and a swing arm move a recording/reproducing head over a magnetic recording medium.

FIG. 3 is a block diagram of the magnetic recording apparatus according to this embodiment. The magnetic recording apparatus consists of a circuit system, a servo system, a head system, and a magnetic recording medium 140. Information can be recorded on the recording medium 140, which is mounted on a rotating motor (not shown) to be moved in the direction indicated by an arrow in FIG. 3. The circuit system consists mainly of an encoding circuit 161, a recording head driver 164, a laser driver 166, a reproducing head driver 169, a signal processing circuit 171, a decoding circuit 173 and a controller 176. The servo system consists mainly of a rotary actuator 201 and a swing arm 133. The head system consists mainly of a slider 110, a magnetic head 131 and a semiconductor laser 132. The rotary actuator 201, the swing arm 133 and the slider 110 are similar in structure and connection to those shown in FIG. 6.

Positioning of Recording/Reproducing Head

Figure 7:
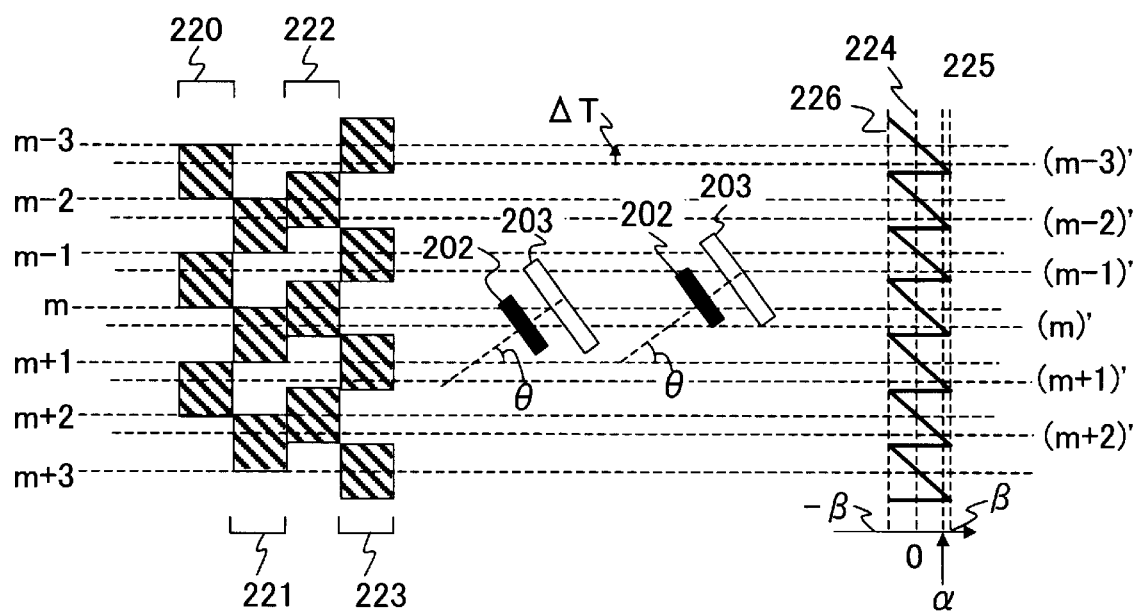
FIG. 7 shows how a recording head and a reproducing head make offsets when they follow up tracks.
Figure 8:
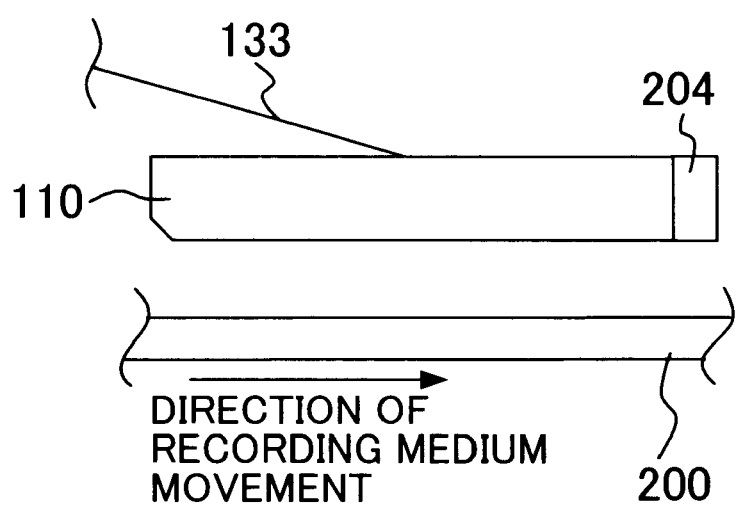
FIG. 8 schematically shows the structure of a conventional magnetic head.

Information can be recorded or reproduced with the swing arm 133 pivoting on the axis of the rotary actuator 201 to position the magnetic head 131 at a target sector. The track servo used a conventional method as shown in FIG. 7. As stated already, however, the recording/reproducing head according to the present invention includes a reproducing magnetoresistive element interposed between magnetic poles for applying a recording magnetic field to a magnetic recording medium.

Figure 11:
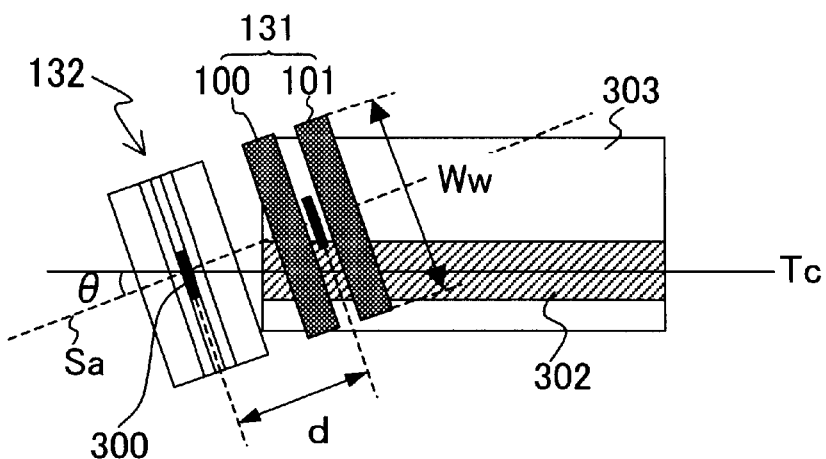
FIG. 11 is a conceptual view showing the relationship between a heating-up region and a magnetic field application region that are formed by the semiconductor laser and the recording head, respectively, that are mounted on a swing arm.

The magnetic recording apparatus according to the present invention positions the semiconductor laser and the recording head at a desired track by means of the rotary actuator. Therefore, it is necessary to prevent the tracking offsets, as stated in connection with FIG. 11, of the semiconductor laser and the recording head from the code tracks. Similarly to the rotary actuator shown in FIG. 6, the rotary actuator of this embodiment is designed to form with each track a yaw angle (θ) larger than −6 degrees and smaller than 16 degrees (−6 deg<θ<16 deg). Due to the relationship of Tww=α×Wa×cos θ, the heating-up (high-temperature) region heated by the laser light source 132 had a width of Tww (θ=−6 deg)=0.40 µm for θ=−6 deg and a width of Tww (θ=+16 deg)=0.38 µm for θ=+16 deg. The upper and lower magnetic shields 100 and 101 each had a width of 3.3 µm.

The size Wa of the emission port of the semiconductor laser was 1 μm. The substitution of these values in the foregoing expression (2) requires that, if the yaw angle is the negative maximum value of −6 degrees, the width of the upper magnetic shield 101 for meeting this expression be larger than 1.46 μm. This substitution also requires that, if the yaw angle is the positive maximum value of 16 degrees, the width of the upper magnetic shield 101 for meeting the expression (2) be larger than 3.27 μm. Accordingly, in order for the heating-up region to be positioned in the recording magnetic field application region for any yaw angle of 6, the upper magnetic shield 100 may be wider than 3.27 μm.

Figure 12:
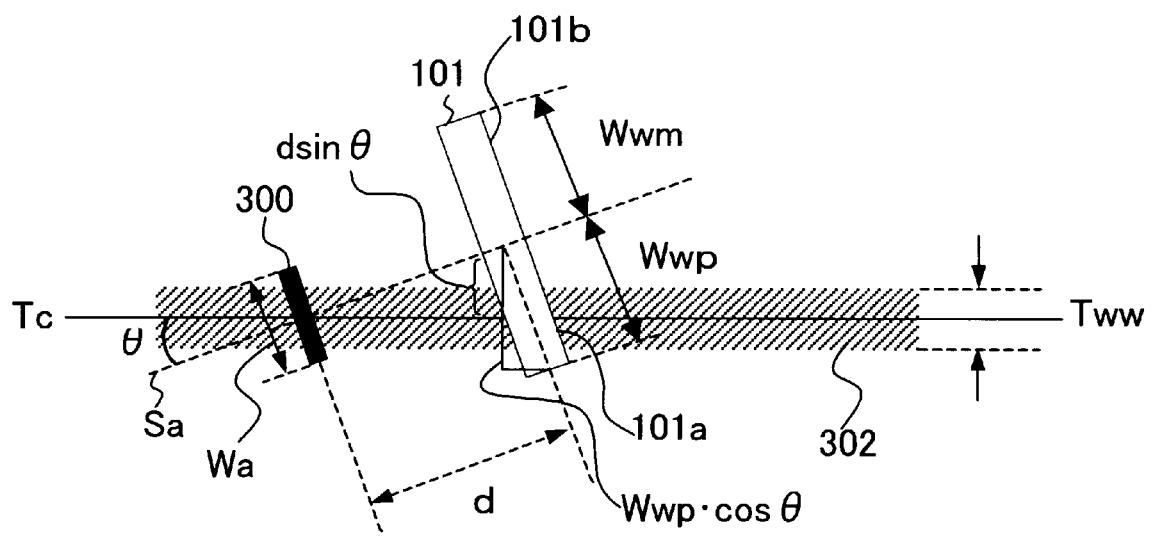
FIG. 12 shows a condition under which a heating-up region is positioned in a magnetic field application region always for any yaw angle θ.

As stated above, the upper and lower magnetic shields 100 and 101 each had a width of 3.3 μm, so that the expression (2) was met. Accordingly, wherever the recording/reproducing head is positioned in the recording region of the magnetic recording medium, the heating-up region 302 heated by the laser beam radiation is positioned in the magnetic field application region 303. Consequently, even if the rotary actuator moves the laser light source and the recording/reproducing head, it is possible to record information in a desired position on the recording medium by means of light-assisted magnetic recording. If the yaw angles on the positive and negative sides differ as stated above, the lower magnetic shield 100 may have asymmetric lengths with respect to the axis of the swing arm. In other words, according to the relationship of the expression (2), the lengths of Wwm and Wwp of the halves 101b and 101a (FIG. 12) of the lower magnetic shield 100 must be larger than 0.73 and 1.63, respectively, for θ=−6 degrees. Therefore, a length larger than 2.36 μm (=0.73+1.63) is sufficient as the width of the lower magnetic shield 100 having asymmetric lengths.

With reference to FIGS. 3 and 5, a means for positioning the recording/reproducing head 130 at an arbitrary sector is described below. In order to position the recording/reproducing head 130 at a sector, it is necessary to find out where this head 130 is positioned currently over the magnetic recording medium 140. If the current position of the recording/reproducing head 130 is found out, it is possible to find out the distance between this head 130 and a target position, so that the rotary actuator can move the head 130 by this distance. For that purpose, the controller 176 for controlling the magnetic recording apparatus outputs a reproducing gate signal 175 that is high in level (level "H") while the magnetic head 131 is positioned in the management region 142 of the sector. The reproducing head driver 169 acquires through the magnetic head 131 the analog reproduced signal 168 associated with the address recorded in the management region 142. When the gate signal 175 is high, this head driver 169 digitizes the acquired analog signal 168 and outputs the digitized signal as a digital reproduced signal 170. The digital reproduced signal 170 undergoes processing such as equalization or maximum likelihood decoding and is subsequently binarized in the signal processing circuit 171, which outputs a binary signal 172. The decoding circuit 173 decodes the binary signal 172 under a predetermined decoding rule and outputs the decoded signal as detected data 174. The controller 176 detects from the reproduced data 174 the address recorded in the management region 142. The address detection makes it possible to find out where the magnetic head 131 is positioned over the recording medium 140. Subsequently, on the basis of the current position of the magnetic head 131, the controller 176 computes the distance between this head 131 and the target sector. Then, the controller 176 transmits to the rotary actuator 201 a positioning command signal 177 corresponding to the computed distance. Receiving the command signal 177, the rotary actuator 201 moves the swing arm 133 in accordance with the received signal. Thereafter, the controller 176 outputs a reproducing gate signal 175 that is high in level when the magnetic head 131 is positioned in a management region 142. Then, the controller 176 confirms where the magnetic head 131 is positioned over the recording medium 140. The foregoing operations are repeated so that the magnetic head 131 can be positioned at the target sector.

Recording of Information

A means for recording information is described below with reference to FIGS. 3 and 5. In the case of information being recorded, the recording/reproducing head 130 is positioned as stated above. When the recording/reproducing head 130 is positioned at a target sector, the controller 176 outputs a recording gate signal 163 that is high in level only while this head 130 is positioned in the data recording region of the sector. When the recording gate signal 163 is high, the encoding circuit 161, the recording head driver 164 and the laser driver 166 operate. The encoding circuit 161 encodes user data 160 under a predetermined encoding rule. The encoding circuit 161 outputs the encoded data as an encoded signal 162. On the basis of the encoded signal 162, the recording head driver 164 passes a coil driving current 165 through the coil 105 of the magnetic head 131, which then applies a magnetic field to the magnetic recording medium 140. At the same time, the laser driver 166 passes a laser driving current 167 through the semiconductor laser 132, which then radiates a laser beam onto the recording medium 140.

A laser beam can be radiated by the following two methods (FIG. 5).
(A) A method of radiating a laser beam in a direct-current fashion in a data recording region.
(B) A method of radiating a pulsed laser beam by switching a laser on and off in a data recording region.

In order for the width along the y-axis of the high-temperature region 151 shown in FIG. 10, where information can be recorded, to be 0.5 μm, the method (B) requires a laser beam to have a higher intensity than the method (A). However, because the method (B) can steepen the gradient of a heat distribution, it enabled the heat interference with the adjacent code tracks to be less.

As stated above, in the combination of the recording/reproducing head 130 and the magnetic recording medium 140 that were used in this embodiment, the intensity of the laser beam was adjusted in such a manner that the width along the y-axis (in the track direction) of the high-temperature region 151 shown in FIG. 10 was 0.5 μm, which was equal to the track width.

Reproduction of Information

A means for reproducing information is described below with reference to FIGS. 3 and 5. In the case of information being reproduced, the recording/reproducing head 130 is positioned as stated above. When the recording/reproducing head 130 is positioned at a target sector 141, the controller 176 outputs a reproducing gate signal 175 that is high in level while this head 130 is positioned in the data recording region 143 of the sector. The reproducing head driver 169 acquires through the magnetic head 131 the analog reproduced signal 168 representing the information recorded in this region 143. When the reproducing gate signal 175 is high, the reproducing head driver 169 digitizes the acquired analog signal 168 and outputs the digitized signal as a digital reproduced signal 170. The digital reproduced signal 170 undergoes processing such as equalization or maximum likelihood decoding in the signal processing circuit 171, which outputs a binary signal 172. The decoding circuit 173 decodes the binary signal 172 under a (the) predetermined decoding rule and outputs the decoded signal as reproduced data 174.

The present invention has been described hereinbefore in detail with reference to the embodiments, to which it is not limited. The invention includes modifications and improvements on which one skilled in the art think of from the embodiments. The semiconductor laser may be made of any material and have any structure. Laser radiation determines the width of each high-temperature region, where information can be recorded. The width of each high-temperature region, the track width and the width of each magnetic field application region may be selected suitably within the ranges for the invention.

INDUSTRIAL APPLICABILITY

The recording/reproducing head and the magnetic recording apparatus according to the present invention provide stable track servo even if information is recorded and reproduced with narrowed track spacing. Even for the narrowed track spacing, it is not necessary to narrow the recording magnetic head. This enables the recording magnetic head to generate a strong magnetic field for stable recording of information. The recording/reproducing head and the magnetic recording apparatus can be produced easily at low cost.

What is claimed is:

1. A recording/reproducing head for recording on and reproduction from a magnetic recording medium, the head comprising:
    a recording magnetic head which applies a magnetic field to a predetermined part of the recording medium, the magnetic head having a pair of magnetic poles;
    a laser source which irradiates at least part of the predetermined part with a laser beam; and
    a magnetoresistive element which detects a magnetic field leaking from a record mark formed by the magnetic head, the magnetoresistive element being interposed between the pair of the magnetic poles of the magnetic head;
    wherein a distance between a light emitting section of the laser source and the magnetoresistive element is not more than 5 $\mu$m.

2. The recording/reproducing head as defined in claim 1 wherein a region irradiated with the laser beam is smaller than the predetermined part in the track direction of the magnetic recording medium.

3. The recording/reproducing head as defined in claim 1 and further comprising:
    a slider;
    the recording magnetic head, the laser source and the magnetoresistive element being fitted coaxially on the slider.

4. The recording/reproducing head as defined in claim 1 wherein the magnetic poles of the recording magnetic head have a width greater than a track pitch of the magnetic recording medium.

5. The recording/reproducing head as defined in claim 4 wherein a width Tw of the record mark recorded on the magnetic recording medium, and the width W of the magnetic poles meet 2×Tw<W.

6. The recording/reproducing head as defined in claim 1 wherein the laser source is a semiconductor laser.

7. A magnetic recording apparatus comprising:
    a magnetic recording medium, on which information is recorded;
    a recording/reproducing head which records information on the recording medium and reproduces recorded information; and
    a rotary actuator which supports the recording/reproducing head and moves the head relative to the recording medium;
    the recording/reproducing head including:
        a recording magnetic head which applies a magnetic field to a predetermined part of the recording medium, the magnetic head having a pair of magnetic poles;
        a laser source which irradiates at least part of the predetermined part with a laser beam; and
        a magnetoresistive element which detects a magnetic field leaking from a record mark formed by the magnetic head, the magnetoresistive element being interposed between the pair of the magnetic poles of the magnetic head;
        wherein a distance between a light emitting section of the laser source and the magnetoresistive element is not more than 5 $\mu$m.

8. The magnetic recording apparatus as defined in claim 7 wherein a region of the magnetic recording medium that is heated by the laser source has a width Tww in a track direction, the rotary actuator forming a yaw angle $\theta$ with a track, the magnetic poles having a width Ww, a distance between the semiconductor laser and the recording magnetic head being d, Tww/2+d×|sin $\theta$|<(Ww/2)×|cos $\theta$| being met.

9. The magnetic recording apparatus as defined in claim 7, further comprising a swing arm connected to the rotary actuator, the arm supporting the recording/reproducing head.

10. The magnetic recording apparatus as defined in claim 7, further comprising:
    a slider;
    the magnetic head, the laser source and the magnetoresistive element being fitted coaxially on the slider.

11. The magnetic recording apparatus as defined in claim 7 wherein the magnetic poles of the recording magnetic head have a width greater than a track pitch of the magnetic recording medium.

12. The magnetic recording apparatus as defined in claim 7 wherein a width Tw of the record mark recorded on the magnetic recording medium, and the width W of the magnetic poles meet 2×Tw<W.

13. The magnetic recording apparatus as defined in claim 7, further comprising: a laser driver which applies an electric current to the laser source to control laser oscillation; a recording head driver which controlls the recording magnetic head to apply a magnetic field to the magnetic recording medium; and a magnetoresistive element driver which aquires a reproduced signal from the recording medium by means of the magnetoresistive element.

14. The magnetic recording apparatus as defined in claim 7 wherein the laser source is a semiconductor laser.

15. The magnetic recording apparatus as defined in claim 14 wherein the laser beam from the semiconductor laser is direct-current light.

16. The magnetic recording apparatus as defined in claim 14 wherein the laser beam from the semiconductor laser is pulsed light.

\* \* \* \* \*